United States Patent
Blatter et al.

(10) Patent No.: US 7,892,354 B2
(45) Date of Patent: Feb. 22, 2011

(54) PROCESS FOR THE PARALLEL DETECTION OF CRYSTALLINE FORMS OF MOLECULAR SOLIDS

(75) Inventors: Fritz Blatter, Reinach (CH); Martin Szelagiewicz, Münchenstein (CH); Markus von Raumer, Arlesheim (CH)

(73) Assignee: Solvias AG, Basel (CH)

( * ) Notice: Subject to any disclaimer, the term of this patent is extended or adjusted under 35 U.S.C. 154(b) by 1293 days.

(21) Appl. No.: 10/574,857

(22) PCT Filed: Oct. 4, 2004

(86) PCT No.: PCT/EP2004/052421

§ 371 (c)(1), (2), (4) Date: Apr. 6, 2006

(87) PCT Pub. No.: WO2005/037424

PCT Pub. Date: Apr. 28, 2005

(65) Prior Publication Data

US 2007/0134803 A1    Jun. 14, 2007

(30) Foreign Application Priority Data

Oct. 6, 2003    (CH) .................................... 1688/03

(51) Int. Cl.
*H01L 21/322* (2006.01)
*C30B 15/14* (2006.01)
*B01D 9/00* (2006.01)
*A01N 43/40* (2006.01)

(52) U.S. Cl. ............................ 117/2; 117/3; 422/245.1; 514/338

(58) Field of Classification Search ............ 117/2, 117/3; 422/245.1; 514/338
See application file for complete search history.

(56) References Cited

U.S. PATENT DOCUMENTS 5,363,797 A * 11/1994 Uenishi et al. ............... 117/68

(Continued)

FOREIGN PATENT DOCUMENTS

WO    00/60345    10/2000

(Continued)

OTHER PUBLICATIONS

R. Hilfiker et al., "Polymorphism—Integrated Approach from High-Throughput Screening to Crystallization Optimization", Journal of Thermal Analysis and Colorimetry, vol. 73, pp. 429-440, 2003.

*Primary Examiner*—Robert M Kunemund
*Assistant Examiner*—G. Nagesh Rao
(74) *Attorney, Agent, or Firm*—Wenderoth, Lind & Ponack, L.L.P.

(57) ABSTRACT

A process for the detection of polymorphic or pseudopolymorphic forms of solid, molecular and crystallizing compounds, or of molecular, cocrystalline compounds or of solid solutions which consist of at least two solid, molecular and crystallizing compounds, in a series investigation using an apparatus for parallel investigations in vessels of an array under different conditions in each vessel, in which substantially only the amorphous form of the crystallizing compound, a solvate of the crystallizing compound or substantially only the amorphous form or a solvate of a compound in a mixture of at least two compounds is used as a suspension or solution, the solutions of amorphous compound having, at the same temperature, a higher content of crystallizable compounds than is achievable with a corresponding crystalline compound.

10 Claims, 1 Drawing Sheet

U.S. PATENT DOCUMENTS

| | | | |
|---|---|---|---|
| 5,614,726 A * | 3/1997 | Kaye et al. | 250/574 |
| 5,997,636 A * | 12/1999 | Gamarnik et al. | 117/70 |
| 6,150,380 A * | 11/2000 | Lovqvist et al. | 514/338 |
| 6,267,935 B1 * | 7/2001 | Hol et al. | 422/245.1 |
| 6,371,640 B1 * | 4/2002 | Hajduk et al. | 378/208 |
| 6,507,636 B1 * | 1/2003 | Lehmann | 506/12 |
| 6,750,064 B2 * | 6/2004 | Stahly et al. | 436/181 |
| 6,977,723 B2 * | 12/2005 | Lemmo et al. | 356/301 |
| 7,061,605 B2 * | 6/2006 | Lemmo et al. | 356/300 |
| 2002/0048610 A1 * | 4/2002 | Cima et al. | 424/725 |
| 2003/0027348 A1 | 2/2003 | DeLucas et al. | |
| 2003/0032666 A1 | 2/2003 | Van Der Schaaf et al. | |
| 2003/0096421 A1 | 5/2003 | DeLucas et al. | |
| 2003/0162226 A1 | 8/2003 | Cima et al. | |
| 2003/0190758 A1 | 10/2003 | Stahly et al. | |
| 2004/0209304 A1 | 10/2004 | Stahly et al. | |
| 2004/0239044 A1 | 12/2004 | Blatter et al. | |
| 2004/0252299 A9 | 12/2004 | Lemmo et al. | |
| 2007/0134803 A1 * | 6/2007 | Blatter et al. | 436/96 |

FOREIGN PATENT DOCUMENTS

| | | |
|---|---|---|
| WO | 01/51919 | 7/2001 |
| WO | 02/052919 | 7/2002 |
| WO | 03/026797 | 4/2003 |

* cited by examiner

PROCESS FOR THE PARALLEL DETECTION OF CRYSTALLINE FORMS OF MOLECULAR SOLIDS

The present invention relates to a process for the detection of as many crystalline, including polymorphic and pseudopolymorphic, forms of solid, molecular and crystallizing compounds, or all of said forms, in a series investigation in which, in apparatuses for parallel investigations (systems for high-throughput screening, HTS), substantially only the amorphous form or a solvate is initially introduced into containers of an array, a phase equilibrium is allowed to become established under different conditions (for example by stirring or shaking of suspensions), and the resulting polymorphic or pseudopolymorphic form of the crystallized compound is then identified in each vessel. The invention also relates to a process for the detection of molecular cocrystalline compounds (so-called molecular compounds) or solid solutions which may consist of at least two or more components, at least one of which is used as an amorphous form or solvate. The invention furthermore relates to an apparatus for the parallel detection of polymorphic forms of solid, molecular and crystallizing compounds, in which, in the containers of an array, (a) a suspension or solution of a crystallizing compound which is present substantially only in amorphous form or as solvate or was dissolved as an amorphous form or solvate is present, or (b) at least two compounds are present in suspension or dissolved form, at least one of which compound is substantially amorphous or a solvate or was dissolved as an amorphous form or solvate.

Polymorphic forms and solvates (also known as pseudopolymorphic or solvatomorphic forms, hydrates and the polymorphs thereof being included) and salts and their polymorphic and pseudopolymorphic forms of crystalline pharmaceutical and agrochemical active substances and fine chemicals, such as pigments and additives for plastics, have become very important since they may have different properties which are decisive for the production and handling properties, efficacy and formulatability. Methods which make it possible to carry out experiments in parallel arrangements under different conditions in order to be able to carry out investigations quickly and in a time-saving manner and to obtain results which can be evaluated have recently been developed for the detection of polymorphic and pseudopolymorphic forms, and salts and the polymorphic and pseudopolymorphic forms thereof. The methods use apparatuses which have an array of vessels in order to treat substances in the individual vessels under different conditions, for example different solvents or solvent systems and/or different physical conditions. The determination of the polymorphic and pseudopolymorphic forms, salts and the polymorphic and pseudopolymorphic forms thereof can be carried out directly in the vessels of the array, for example by means of optical or diffractometric methods. However, the crystalline compounds obtained can also be removed beforehand and then investigated and determined in other sample containers. The arrays for vessels may be trays having recesses for holding vessels (mobile systems) or blocks into which one- or two-dimensional rows of vessels are let, such as, for example, microtitre plates. The filling and the treatment and identification of the crystalline substances obtained can be carried out in systems for high-throughput screening, with partial or complete automation. Such apparatuses are described, for example, in WO 00/67872, WO 01/09391, WO 01/51919, EP-A1-1 172 646, WO 03/014732, WO 03/026797 and WO 04/045769.

Thermodynamically stable and, with few exceptions, metastable crystalline forms, as isolated, for example, during their chemical preparation, have been used to date for such parallel investigations. This procedure requires a large number of individual experiments in a plurality of parallel investigations in order to detect new polymorphic forms, the accessibility to the totality of all crystalline forms being more difficult. Thus, S. L. Morisette et al. in PNAS, Volume 100(5), pages 2180 to 2184 (2003) describe parallel investigations with crystalline ritonavir, in which in total 2000 experiments were required in order to discover a new crystal form. This result also makes it clear that, by this route, in spite of a large number of experiments, only one polymorphic form or a few polymorphic forms of a crystalline substance can be detected and others remain concealed. In Crystal Growth & Design, Volume 3, No. 6, pages 927 to 933 (2003), Ö. Almarsson mentions that both the thermodynamically most stable form I and others of the known metastable forms are observed in an HTS screening with about 2000 experiments by means of crystallization of solutions of the metastable form II of sertralin hydrochloride.

It has now surprisingly been found that, in parallel investigations with considerably fewer experiments and lower substance requirement and consumption of chemicals, a larger number of, or even all, crystalline polymorphic and pseudopolymorphic forms or cocrystalline compounds or solid solutions of at least two components can be found (if they are in existence) in shorter periods and very few, preferably in one to five, operations when, for the investigation, the amorphous form or a solvate of a crystalline compound, or at least one amorphous form or one solvate in a mixture of at least two compounds is used as a suspension or solution in all vessels of an array and a phase equilibrium is established in each vessel under different conditions.

Figure 1:
FIG. 1 illustrates an array of vessels made from a material suitable for in-situ analysis; e.g., quartz. Each vessel typically has a diameter of 10 mm and a depth of about 10 mm and is filled with about 10 mg of amorphous sample previously prepared in a freeze drying experiment.
Figure 2:
FIG. 2 illustrates the array of vessels is sealed with a sealing device and placed on a laboratory shaker to agitate in horizontal plane.
Figure 3:
FIG. 3 illustrates new solid forms are detected by a detection device, which is typically a Raman microscope, or an X-ray diffractometer. The array is turned up-side down to facilitate Raman microscopy through the thin bottom of the array.

The invention firstly relates to a process for the detection of polymorphic or pseudopolymorphic forms of solid, molecular and crystallizing compounds, or of molecular, cocrystalline compounds or of solid solutions which consist of at least two solid, molecular and polar compounds, in a series investigation using an apparatus for parallel investigations in vessels of an array under different conditions in each vessel, and the identification thereof using separate detection units or detection units integrated in the apparatus, in which compounds which crystallize, crystallize with salt formation and/or form solvates or hydrates and crystallize are treated in the presence of identical or different solvents or solvent mixtures under identical or different physical conditions and optionally with salt, solvate or hydrate formation or formation of cocrystalline compounds or solid solutions until a phase equilibrium is established, which is characterized in that substantially only the amorphous form or a solvate of the crystallizing compound or substantially only the amorphous form or a solvate of a compound in a mixture of at least two compounds is used as a suspension or solution, the solutions of amorphous compounds or solvates having, at the same temperature, a higher content of crystallizing compounds than is achievable with a corresponding crystalline compound.

In the context of the invention, substantially amorphous means that predominantly the amorphous form is present or was used for the preparation of solutions. Depending on the preparation, amorphous substances may contain crystalline (metastable) phases which, however, are often not measurable. The content of crystalline phases may be, for example, up to 20% by weight, preferably up to 10% by weight, more preferably up to 5% by weight and particularly preferably only up to 2% by weight. In the context of the invention, amorphous forms are also understood as meaning mesomorphic forms and mesophases and liquid crystal-like forms having limited close-range and long-range order (cf. for example B. Wunderlich in Macromol. Symp. 113, pages 51 to 65 (1997) and in Thermochimica Acta 340-341 (1999), pages 37 to 52. In the context of the invention, solvates are understood as meaning solid compounds having a content of solvent(s) including water, it of course being possible for these solvates to be present as amorphous or polymorphic forms.

Amorphous and mesomorphic forms and solvates are as a rule substantially better soluble than corresponding solvent-free, crystalline compounds (cf. for example B. C. Hancock et al. in Pharmaceutical Research, Volume 17, No. 4, pages 397 to 404, and L.-F. Huang et al. in Advanced Drug Delivery Reviews 56 (2004), pages 321 to 334. Solutions to be investigated can therefore have a substantially higher concentration of compounds than is achievable with a crystalline compound. In the context of the invention, higher concentration may mean an excess of at least 30% by weight, preferably at least 50% by weight and particularly preferably at least 100% by weight, based on the amount of corresponding crystalline compound dissolved under identical conditions. Solvates can in principle be formed with all solvents, the tendency to solvate formation being substantially the property of the compound to be investigated. It should furthermore be mentioned that mixed solvates of at least two different solvents are also included, such as solvates in whose channel-like structures or other cavities of the solid form nonstoichiometric amounts of solvent may be enclosed.

Examples of solvate-forming solvents are water, alkanols (methanol, ethanol, n-propanol or isopropanol, n-butanol, isobutanol or tert-butanol, methoxy- or ethoxyethanol), polyols (glycols, such as ethylene glycol, propylene glycol, butylene glycol, glycerol, trimethylol-methane, trimethylolethane or pentaerythritol), open-chain and cyclic ethers (diethyl ether, diisobutyl ether, di-n-propyl ether, diisopropyl ether, di-n-butyl ether, methyl tert-butyl ether, tetrahydrofuran, dioxane), ketones (acetone, methyl ethyl ketone, methyl isopropyl ketone), sulphoxides (dimethyl sulphoxide, tetramethylene sulphoxide), halohydrocarbons (methylene chloride, chloroform), nitriles (acetonitrile), mono- and dicarboxylic acids (formic acid, acetic acid, propionic acid, benzoic acid, succinic acid, fumaric acid), carboxylic esters (methyl, ethyl and isopropyl acetate), aromatic hydrocarbons (benzene, toluene, xylene or anisole) and carboxamides (dimethylformamide, N-methylpyrrolidone).

The solutions may be present as dilute, saturated or supersaturated solutions. Under the same conditions (for example, same temperature and same solvent or solvent mixture) considerably more of an amorphous substance or several times the amount of an amorphous substance can be dissolved in comparison with stable or metastable crystalline compounds.

In the context of the invention, higher contents may mean an excess of at least 30% by weight, preferably at least 50% by weight and particularly preferably at least 100% by weight, based on the amount of a corresponding crystalline compound dissolved under identical conditions.

If at least two compounds are used for the formation of cocrystalline compounds or solid solutions, only one compound or both compounds may be amorphous.

Apparatuses for parallel investigations are known and are described in detail in the above-mentioned literature. The vessels for holding the samples may consist of different materials, for example glass, quartz, plastic (Teflon), metals or metal alloys. The volume of the vessels may be, for example, 0.1 to 100 ml and preferably 0.5 to 20 ml. The surfaces of the vessels may be modified in order to create suitable nucleation conditions and in order to facilitate deposition or collection of the crystals on the bottom of the vessel. The vessels may be present in recesses of trays and may be removed for detections. In the process according to the invention, apparatuses having flow-through seals, as described in WO 03/026797, are preferably used, and have transparent microtitre plates as an array for sample vessels. For series investigations with systems in which neither feed nor removal of substances is necessary, such seals are likewise suitable, but without flow-through channels (WO04/045769).

The flow-through seals consist of a substrate and at least two seals which are arranged in rows and let air-tight into cavities and project from the substrate on the side of inlet and outlet orifices, one end of the substrate being provided with an inlet orifice and one end with an outlet orifice, and the seals being provided with at least one inlet orifice and one outlet orifice, and the substrate contains at least one first continuous channel which begins at the inlet orifice and is arranged in such a way that it opens into inlet orifices on the side walls of the seals arranged in series, and a second continuous channel which begins at the outlet orifice and is arranged in such a way that it opens into outlet orifices on the side walls of the seals arranged in series. Preferably, a titre plate comprising an optically transparent material, with the wells of which the seals of the apparatus have an air-tight connection, is used for series investigations. The titre plate preferably consists of quartz. Particularly preferably, the flow-through seal consists of a single-row arrangement of seals which have an air-tight connection with corresponding rows of wells of a titre plate. Titre plates are standardized with regard to the number of vessels, and they generally contain 12, 24, 48, 96 (etc.) vessels. Trays having removable vessels are frequently standardized in the same way.

Preferably used according to the invention is an arrangement for the chemical or physical modification of substances and the determination thereof by means of spectroscopic methods, which consists of a) a flow-through seal of the type described above;

b) a titre plate whose row of wells has an air-tight connection with the seals of the flow-through seal;

c) connections between the inlet and outlet orifices to one or more gas sources and/or a vacuum pump;

d) a radiation source for radiating light into the vessels; and e) a detector for measuring spectral changes.

Suitable radiation sources are lamps (mercury vapour lamps) or lasers (gas lasers, crystal lasers, semiconductor or diode lasers) or X-ray sources. Customary optical means for focusing the light beams onto the vessel and a detector can be arranged between detector.

For example, detectors for recording spectra in the UV range, visible range, IR range and NIR range and Raman spectra or for recording X-ray diffraction patterns in the reflection or transmission mode are suitable.

The crystallizing compounds may be neutral or ionic (nitrogen bases, acids and salts) organic compounds. For example, nitrogen bases or organic acids, such as carboxylic acids, sulphonic acids or phosphonic acids, may be mentioned as compounds crystallizing with salt formation. From nitrogen bases, salts can be formed with inorganic or organic acids or hydrohalic acids.

From acids, alkali metal or alkaline earth metal salts and ammonium salts of ammonia or amines are prepared especially with corresponding bases. Organic compounds forming solvates and hydrates are chiefly those having polar groups and/or groups forming hydrogen bridges. If more than one crystallizing compound, preferably two or three crystallizing compounds, is or are used in a vessel, cocrystalline compounds, mixed crystals or solid solutions may be formed. As already mentioned at the outset, the compounds may be, for example, pharmaceutical and agrochemical active substances and fine chemicals, such as pigments and additives for plastics and other materials.

In the context of the invention, establishment of phase equilibrium means the time which is required before new crystalline forms, cocrystalline compounds, mixed crystals or solid solutions have formed in a sample under given conditions. The time may be minutes to weeks and may be determined by prior testing. In general, a treatment time of 0.1 to 100 and advantageously 0.5 to 48 hours is sufficient. During the establishment of a phase equilibrium, formation of new polymorphic forms, new solvates, new hydrates, new cocrystals or new salts may occur. Furthermore, the course of the establishment of the phase equilibrium can be monitored by interrupting the operation and investigating the crystalline forms in the suspensions, new transition forms being detectable. Optionally, an operation can also be stopped before the phase equilibrium has been established, and the resulting transition forms can be isolated and identified.

Here, an operation corresponds, for example, to the filling of a 48-well microtitre plate and the carrying out of a phase equilibrium experiment according to a selected temperature programme. An individual experiment corresponds to a defined condition in a specific vessel. The number of operations required depends substantially on the number of vessels. The number of operations may be 1 to 5 and preferably 1 to 3.

Different physical conditions may be present, for example, in the pressure, the temperature, the concentration or the rate of vaporization of solvents.

Before carrying out the experiments, it may be expedient to determine the solubility of the compounds in different solvents or solvent mixtures.

In the process according to the invention, solutions or suspensions can be used for crystallization experiments. The crystallization can be effected in a suspension of the amorphous form, solvates, etc. (for example with stirring or shaking), or in solution by evaporation of solvents or by cooling of the solution. Optionally, the crystallization can be effected by heterogeneous seeding with crystal seeds. The evaporation of solvents can be carried out by means of elevated temperature, vacuum or both.

Crystallization experiments can also be carried out under the influence of different physical conditions by conditioning the undissolved amorphous compound, solvates, etc. in the vessels, for example at different temperatures, or different relative humidities or in different gas atmospheres.

The amount of the amorphous form to be used may be, for example, 0.1 to 1000 mg, preferably 1 to 300 mg, more preferably 1 to 100 mg and particularly preferably 2 to 20 mg per individual experiment.

Amorphous forms of crystalline compounds are obtainable by processes known per se, for example lyophilization (freeze-drying), precipitation in solvents with low solubility, by means of rapid evaporation of a solution or rapid cooling (quenching) of melts. What is decisive for short-term stability of the amorphous form is as a rule the range of the glass transition temperature. The glass transition temperature of the amorphous compounds may be, for example, −50 to 400° C., preferably 20 to 200° C. and particularly preferably 50 to 150° C.

The process according to the invention can be carried out, for example, by a procedure in which first amorphous samples or solvates are introduced into the vessels or are produced directly in the vessels, or solutions of the amorphous compounds or solvates in different solvents or solvent mixtures are introduced into the vessels of an array, optionally seed crystals are added and phase equilibrium experiments are then carried out as described above. For the preparation of salts, acids or bases can be added from the beginning or fed in as vapours, optionally with an inert entraining gas. What is important is that, in one operation, as many different conditions as possible prevail during the conditioning, for example through the choice of different physical conditions, different solvents or solvent mixtures, concentration ratios and/or addition of seed crystals or not. Physical conditions may be pressure and a particular level of the temperature and the temperature variation as a function of time. The process according to the invention can be carried out, for example, at constant temperature of −20 to 200° C., preferably 20 to 100° C. Within such temperature ranges, temperatures which are controlled as a function of time and are constant but different may also be used. Within such temperature ranges, constant temperatures or optionally temperatures which are controlled as a function of time and change cyclically may also be used. Heat can be supplied externally or internally by means of heated gases. The conditioning can be effected with stirring or shaking.

In an embodiment of the process according to the invention, conditioning of undissolved amorphous compounds or solvates (suspensions) can be carried out with solvents or solvent mixtures which are identical or different for each vessel, in the presence or absence of nucleating agents until establishment of a phase equilibrium. In this variant, (micro) titre plates having vessels with a small volume of, for example, 0.5 to 5 ml and preferably 1 to 3 ml are advantageously used. For this purpose, externally prepared amorphous substance or solvate can be introduced into the vessels of an array. The production of amorphous substances or of solvates can also be effected directly in the vessels since the amounts of solutions added are in the range of only about 50 to 2000 µl and this amount of solvents to be used can be rapidly evaporated (particularly if readily volatile solvents are used). The conditioning can be effected at different temperatures, under the action of vapours of different solvents or solvent mixtures or using a combination of the two measures.

In a preferred embodiment, amorphous substances or solvates are suspended in different solvents or solvent mixtures in the individual vessels of an array, preferably a (micro)titre plate. Conditioning can then be effected at defined temperatures or with defined temperature programmes and optionally with stirring or shaking until equilibrium has been established. The crystalline samples which have collected on the bottom of the vessels can then be determined directly in the suspension or after removal of the solvent (for example by evaporation or filtration), for example by means of IR or Raman spectroscopy. For identification, the samples can also first be removed from the vessels and filtered in order to investigate them subsequently by spectroscopy, microscopy or X-ray diffraction.

In a further preferred embodiment, solutions of the amorphous compound or solvates in different solvents and/or solvent mixtures are prepared in the vessels of an array, for example of a microtitre plate, or are introduced into the vessels. The solutions may be heated (for example to 30 to 100° C.). The crystallization is induced by means of cooling, for example by rapid, continuous and/or stepwise cooling to a defined temperature and conditioning in a subsequent phase equilibrium experiment. The identification can then be carried out in the manner described above.

A particular advantage of the use of the amorphous form and of solvates is that it is possible, without strong heating, to prepare solutions which are highly supersaturated with respect to the thermodynamically more stable crystal forms. This advantage is very pronounced in particular in the case of heat-sensitive substances since these can form decomposition products when solutions are heated. A further major advantage is the possibility of dissolving many compounds (for example salts) which are in principle insoluble by means of their amorphous form and thus very considerably extending the possibilities for investigation.

The process according to the invention can be used both for the detection of new crystalline forms of neutral molecules and for the detection of crystalline forms of salts. Furthermore, the process, according to the invention, for the preparation of crystalline salts can optionally be combined with the detection of the crystalline forms of the prepared salts. For this purpose, the previously described solutions of amorphous, basic or acidic compounds or of corresponding solvates in different solvents and/or solvent mixtures can be introduced into the vessels of an array, for example of a microtitre plate, and conditioned in the presence of acids or bases. The acids and bases can be directly added to the solutions or they can be transported into the vessels directly (readily volatile acids and bases) or with the aid of an entraining gas. The solutions can be thermostated and/or cooled for inducing crystal formation. The identification can then be carried out in the manner described above. For salt formation, ammonia, amines, low molecular weight carboxylic acids, inorganic acids (mineral acids) and hydrohalic acids, for example hydrochloric acid, are frequently used.

The abovementioned salt formers can also be used in their amorphous form in order to take advantage of the possible high relative supersaturation of solutions at comparatively low temperatures.

A similar procedure can be adopted in the case of the formation of pseudopolymorphic forms (hydrates or solvates), by passing water vapour or vapours of solvents, optionally together with an entraining gas, into or over the vessels, and effecting conditioning for a sufficient period for the formation of pseudopolymorphic forms. Of course, water or solvent can also be introduced directly into the vessels for this purpose.

Furthermore, in the process according to the invention, solutions or suspensions of different substances, preferably of pharmaceutical formulation auxiliaries, can be initially introduced and the amorphous form or a solvate of the active substance can additionally be dissolved or suspended therein, the phase equilibrium experiments described above then being carried out. It is also possible to use the corresponding formulation auxiliaries, if they are accessible, in their amorphous form.

In the case of pharmaceutical active substances, ethanol, isopropanol, acetone and ethyl acetate and mixtures of these solvents are frequently used for parallel investigations. However, it is also possible to use other solvents and solvent mixtures. Before beginning series investigations, it may be expedient first to determine the solubilities of amorphous compounds in solvents and solvent mixtures and optionally other physicochemical properties. Furthermore, it may be advantageous to determine the behaviour of selected nucleating agents beforehand. The nucleating agents may be other crystalline compounds of similar structure or other crystalline compounds having related or identical crystallographic space groups.

According to the invention, in the detection of molecular, cocrystalline compounds or of solid solutions, at least one crystallizing compound as an amorphous form, preferably in solution, together with at least one further crystalline or amorphous compound, is initially introduced into the vessels and then conditioned. In the process according to the invention, it is particularly advantageous that any desired ratio can be established in order to be able to investigate the formation of defined forms of mixed crystals in a targeted manner.

The invention also relates to an arrangement for the parallel detection of polymorphic or pseudopolymorphic forms of solid, molecular and crystallizing compounds or of molecular, cocrystalline compounds or of solid solutions which consist of at least two solid, molecular and crystallizing compounds, in which, in the containers of an array, substantially only the amorphous form or solvates of the crystallizing compound or substantially only the amorphous form or solvates of a compound in a mixture of at least two compounds is present as a suspension or solution in all vessels, the solutions of amorphous compounds or solvates having, at the same temperature, a higher content of crystallizable compounds than is achievable with a corresponding crystalline compound.

The number of containers may be, for example, 6 to 1000, preferably 12 to 200 and particularly preferably 12 to 96. The volume of the containers depends substantially on the chosen and optionally fully automated complete apparatus. It may be, for example, 0.1 to 100 ml, more preferably 0.1 to 200 ml and particularly preferably 0.5 to 5 ml.

The invention furthermore relates to an apparatus comprising a) an array of vessels for a parallel series investigation, b) devices for stirring, shaking, cooling or heating samples in the vessels and/or evaporating solvents of the samples in the vessels, c) detection units which are separate or are integrated in the apparatus and comprise radiation source and measuring unit for the determination of polymorphic or pseudopolymorphic forms of solid, molecular and crystallizing compounds or of molecular, cocrystalline compounds or of solid solutions which consist of at least two solid, molecular and crystallizing compounds, wherein substantially only the amorphous form of the crystallizing compound or a solvate thereof or substantially only the amorphous form of a compound or a solvate thereof in a mixture of at least two compounds is present as a suspension or solution in all vessels, the solutions of amorphous compounds and solvates having, at the same temperature, a higher content of crystallizing compounds than is achievable with a corresponding crystalline compound.

In a preferred embodiment, as a rule all samples differ from one another at least in one physical or physicochemical parameter, for example temperature, type of solvent and/or concentration of the compound.

Preferred apparatuses are those comprising a) a flow-through seal of the type described above;

b) a titre plate whose row of wells have an air-tight connection with the seals of the flow-through seal;

c) connections between the inlet and outlet orifices of the flow-through seal to one or more gas sources and/or a vacuum pump;

d) a radiation source for radiating light into the vessels;

e) a detector for measuring spectral changes; and f) optionally arrangements for shaking, heating and/or cooling the titre plate;

wherein substantially only the amorphous form or a solvate as a suspension or as a saturated or supersaturated solution is present as a sample in all wells (vessels) of the titre plate.

The process according to the invention has a number of advantages for the detection of polymorphic and pseudopolymorphic forms or of molecular, cocrystalline compounds or of solid solutions, which could not be achieved to date in series investigations:

a) fewer experiments, b) lower substance requirement and consumption of chemicals, c) reduction of time required, d) detection of a plurality of or all stable, polymorphic and pseudopolymorphic forms, e) only one series investigation for the detection of a plurality of polymorphic or pseudopolymorphic forms or of as many as possible of said forms and f) extension of the possibilities of investigation by the high solubility of the amorphous substances and solvates.

The examples which follow explain the invention in more detail.

COMPARATIVE EXAMPLE

With Thermodynamically Stable form as Starting Material

The different crystal forms of sertraline HCl have been thoroughly investigated to date. The crystal form I of sertraline HCl is known to be the thermodynamically most stable form. Sertraline HCl form II is likewise an important crystal form. Although this form is thermodynamically metastable, it has sufficient kinetic stability to permit it to be used as an active substance in a pharmaceutical formulation. At present, about 27 different crystal forms of sertraline HCl [S. L. Morisette et al.; Advanced Drug Delivery Reviews 56 (2004) 275-300] are mentioned in the literature, indicating a complex situation with regard to the different solid forms of sertraline HCl. A reference experiment with the stable form I as starting material is designed in such a way that 64 experiments are carried out for establishing the phase equilibrium in suspensions of 32 different solvents and solvent mixtures. For this purpose, 32 of the vessels in a 96-well quartz microtitre plate are each filled with about 5 mg of sertraline HCl form 1, and 100 microlitres of the corresponding solvent are then introduced into each vessel in accordance with the plan below, and the plate is closed with seals.

| | |
|---|---|
| A1 | Acetic acid/ethyl acetate (1:9) |
| A3 | Propylene glycol/TBME (1:9) |
| B1 | Anisole |
| B3 | Dioxane |
| C1 | Acetone |
| C3 | Methanol |
| D1 | 1-Butanol |
| D3 | N-Methylpyrrolidone/ethyl acetate (1:9) |
| E1 | Methyl tert-butyl ether (TBME) |
| E3 | Water |
| F1 | Dimethyl sulphoxide/ethyl acetate (1:9) |
| F3 | Acetonitrile/isopropyl ether (1:9) |
| G1 | Ethanol |
| G3 | Ethanol/water (8:2) |
| H1 | Ethyl acetate |
| H3 | Tetrahydrofuran/water (1:1) |
| A2 | Heptane/acetone (1:1) |
| A4 | N-Methylpyrrolidone/ethanol (1:9) |
| B2 | Ethyl methyl ketone |
| B4 | Acetone/water (8:2) |
| C2 | 1-Propanol |
| C4 | Isopropanol/water (95:5) |
| D2 | 2-Propanol |
| D4 | Methanol/water (9:1) |
| E2 | Tetrahydrofuran |
| E4 | Ethyl acetate/acetone (1:1) |
| F2 | Acetonitrile |
| F4 | Ethanol/tetrahydrofuran (1:1) |
| G2 | Dichloromethane |
| G4 | Ethyl methyl ketone/water (9:1) |
| H2 | Dimethylformamide/TBME (1:9) |
| H4 | Dichloromethane/methanol (1:1) |

The microtitre plate is then shaken on a mechanical shaker (Eppendorf, Thermomixer Comfort) for 48 hours, the temperature of the mechanical shaker being changed cydically between 18° C. and 28° C. A cycle corresponds to one hour. The shaking frequency is 500 per minute. After a time of 48 hours for establishing equilibrium, the microtitre plate is removed from the mechanical shaker and the solid in each of the occupied vessels is investigated directly in the suspension using a Raman microscope (Renishaw Raman microscope system RM 1000). One or two Raman spectra are recorded in each vessel. The solvents in each vessel are then evaporated with the aid of a seal system having flow-through channels according to WO 03/026797 under nitrogen, a flow rate of about 0.03 litre/hour being established. Altogether, 80 Raman spectra are recorded in 64 experiments (32 directly from the suspension and 32 from the dried suspension).

The measured Raman spectra are divided into different classes of spectra on the basis of their differences. A separate evaluation programme which carries out an automatic comparison of measured spectra on the basis of the wave numbers of emission maxima in the Raman spectrum and generates a classification is used for this purpose. A distinguishing criterion is a similarity factor which is determined by visual assessment of selected, individual spectra. In the experiment carried out here, a similarity factor of 0.5 is used, leading to a grouping of the 80 spectra in 11 different classes. Ideally, these 11 spectral classes also correspond to eleven different solid forms of sertraline HCl. It is remarkable that, although the stable form I is most frequently recovered, the important form II did not form.

EXAMPLE 1

With Amorphous Form of Sertraline HCl as Starting Material

Similarly to the reference example described above, 64 experiments are carried out in 32 different solvents and solvent mixtures in 32 vessels of a 96-well microtitre plate. For this purpose, each of the 32 vessels is occupied with 3 mg of the amorphous form. 100 microlitres of solvent according to the plan given in the comparative example are then filled into each of the 32 vessels, and the plate is closed with seals. The microtitre plate is then shaken on a mechanical shaker (Eppendorf, Thermomixer Comfort), the temperature of the mechanical shaker being changed cyclically between 18° C. and 28° C. A cycle corresponds to one hour, and the shaking frequency is 500 per minute. After a time of 48 hours for establishing the equilibrium, the microtitre plate is removed from the mechanical shaker and the solid in each of the occupied vessels is investigated directly in the suspension using a Raman microscope. One or two Raman spectra are recorded in each vessel. The solvents in each vessel are then evaporated with the aid of a seal system having flow-through channels according to WO 03/026797 under nitrogen, a flow rate of about 0.03 litre per hour being established. Altogether, 92 Raman spectra are recorded in 64 experiments (32 directly from the suspension and 32 from the dried suspension).

The measured Raman spectra are divided into different classes of spectra on the basis of their visual differences (as described in the comparative example). In the experiment carried out here, a similarity factor of 0.5 is used, leading to a grouping of the 92 spectra in 25 different classes of Raman spectra. Ideally, these 25 spectral classes also correspond to 25 different solid forms of sertraline HCl. It is remarkable that here both the thermodynamically stable form I and the important form II are contained in these classes, this being verified by the recording of corresponding reference spectra. The much larger number of classes of Raman spectra (25 compared with 11 in the comparative example) or of solid forms is due to the use of the amorphous starting material.

EXAMPLE 2

With Isopropanol Solvate of Sertraline HCl as Starting Material

Similarly to the reference example described above, 64 experiments are carried out in 32 different solvents and solvent mixtures in 32 vessels of a 96-well microtitre plate. For this purpose, each of the 32 vessels is occupied with 3 mg of the solvate. 100 microlitres of solvent according to the plan given in the comparative example are then filled into each of the 32 vessels, and the plate is closed with seals. The microtitre plate is then shaken on a mechanical shaker (Eppendorf, Thermomixer Comfort), the temperature of the mechanical shaker being changed cyclically between 18° C. and 28° C. A cycle corresponds to one hour, and the shaking frequency is 500 per minute. After a time of 48 hours for establishing the equilibrium, the microtitre plate is removed from the mechanical shaker and the solid in each of the occupied vessels is investigated directly in the suspension using a Raman microscope. One or two Raman spectra are recorded in each vessel. The solvents in each vessel are then evaporated with the aid of a seal system having flow-through channels according to WO 03/026797 under nitrogen, a flow rate of about 0.03 litre per hour being established. Altogether, 92 Raman spectra are recorded in 64 experiments (32 directly from the suspension and 32 from the dried suspension).

The measured Raman spectra are evaluated according to the comparative example. In the experiment carried out here, a similarity factor of 0.5 is used, leading to a grouping of the 92 spectra in 16 different Raman classes. Ideally, these 16 spectral classes also correspond to 16 different solid forms of sertraline HCl. The larger number of spectral classes (16 compared with 11 in the comparative example) or of solid form is due to the use of the isopropanol solvate as starting material.

The result of the two examples also makes it clear that from a large number to all polymorphic and pseudopolymorphic forms of a crystalline compound can be detected in a few operations, especially since different starting materials (amorphous form and solvates) can be used in the operations.

The invention claimed is:

1. In a process for the detection of polymorphic or pseudopolymorphic forms of solid, molecular and crystallizing organic compounds, or of molecular, cocrystalline organic compounds or of solid solutions which consist of at least two solid, molecular and crystallizing organic compounds, in a series investigation using parallel investigations in vessels of an array under different conditions in each vessel, and the identification thereof using separate detection units, in which organic compounds which crystallize, crystallize with salt formation and/or form solvates or hydrates and crystallize are treated in the presence of identical or different solvents or solvent mixtures under identical or different physical conditions and optionally with salt, solvate or hydrate formation or formation of cocrystalline organic compounds or solid solutions until a phase equilibrium is established, the improvement which comprises that only a substantially amorphous form of the crystallizing organic compound or only a substantially amorphous form of an organic compound in a mixture of at least two organic compounds is used as a suspension or solution, wherein "substantially amorphous" means that amorphous substances contain crystalline phases by only up to 10% by weight.

2. A process according to claim 1, wherein the solutions are present as dilute, saturated or supersaturated solutions.

3. A process according to claim 2, wherein the content of the substantially amorphous organic compound in solution is an excess of at least 30% by weight, based on the amount of a corresponding crystalline organic compound dissolved under identical conditions.

4. A process according to claim 3, wherein the excess is at least 50% by weight.

5. A process according to claim 3, wherein the excess is at least 100% by weight.

6. A process according to claim 1, which is carried out in an arrangement for the chemical or physical modification of substances and the determination thereof by means of spectroscopic methods, which consists of a) a flow-through seal formed from a substrate and at least two seals which are arranged in series and are let airtight into cavities and project from the substrate on the side of inlet and outlet orifices, one end of the substrate being provided with an inlet orifice and one end with an outlet orifice, and the seals being provided with at least one inlet orifice and one outlet orifice, and the substrate contains at least one first continuous channel which begins at the inlet orifice and is arranged in such a way that it opens into inlet orifices on the side walls of the seals arranged in series, and a second continuous channel which begins at the outlet orifice and is arranged in such a way that it opens into outlet orifices on the side walls of the seals arranged in series;
b) a titre plate whose rows of wells have an air-tight connection with the seals of the flow-through seal;
c) connections between the inlet and outlet orifices to one or more gas sources and/or a vacuum pump;
d) a radiation source for radiating light into the vessels; and
e) a detector for measuring spectral changes.

7. A process according to claim 1, wherein the substantially amorphous organic compounds are suspended and/or dissolved in different solvents or solvent mixtures and are present in the individual vessels of a titre plate.

8. A process according to claim 7, wherein the solutions or suspensions of the substantially amorphous organic compound in different solvents and/or solvent mixtures are present in the vessels of a titre plate.

9. An arrangement for performing the process of claim 1, wherein only the substantially amorphous form of the crystallizing organic compound, or only the substantially amorphous form of an organic compound in a mixture of at least two organic compounds is present in the containers of an array as a suspension or solution.

10. A process according to claim 1, wherein "substantially amorphous" means that amorphous substances contain crystalline phases by only up to 5% by weight.

* * * * *